Oct. 23, 1923.

F. S. SMITH 1,471,423

ART OF TREATING GRAIN IN BULK BY ELECTRICITY

Filed Feb. 12, 1919

INVENTOR
Franklin S. Smith
BY
Cyrus N. Anderson
ATTORNEY

Oct. 23, 1923. 1,471,423
F. S. SMITH
ART OF TREATING GRAIN IN BULK BY ELECTRICITY
Filed Feb. 12, 1919 4 Sheets-Sheet 2

INVENTOR
Franklin S. Smith
BY
Cyrus N. Anderson
ATTORNEY

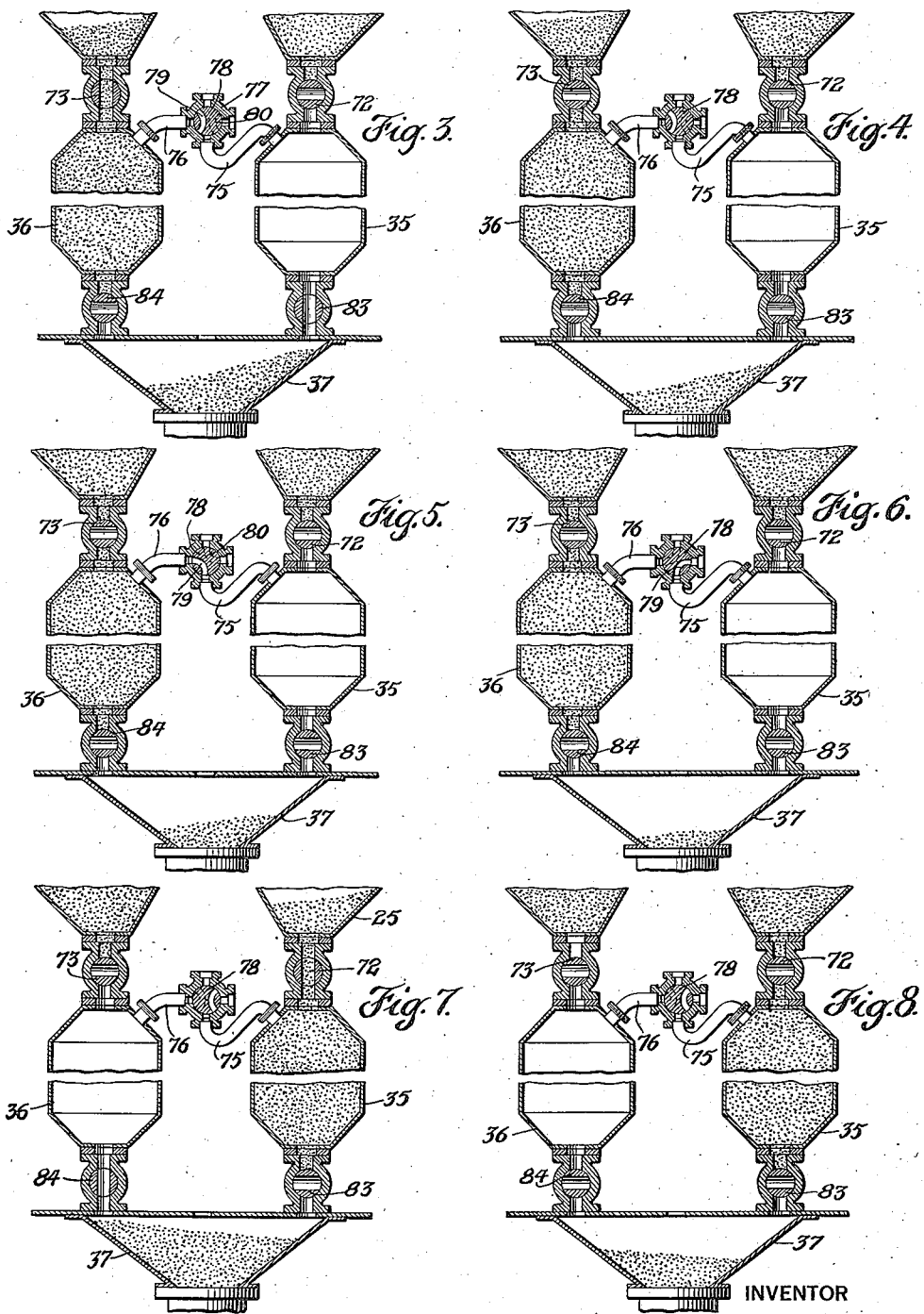

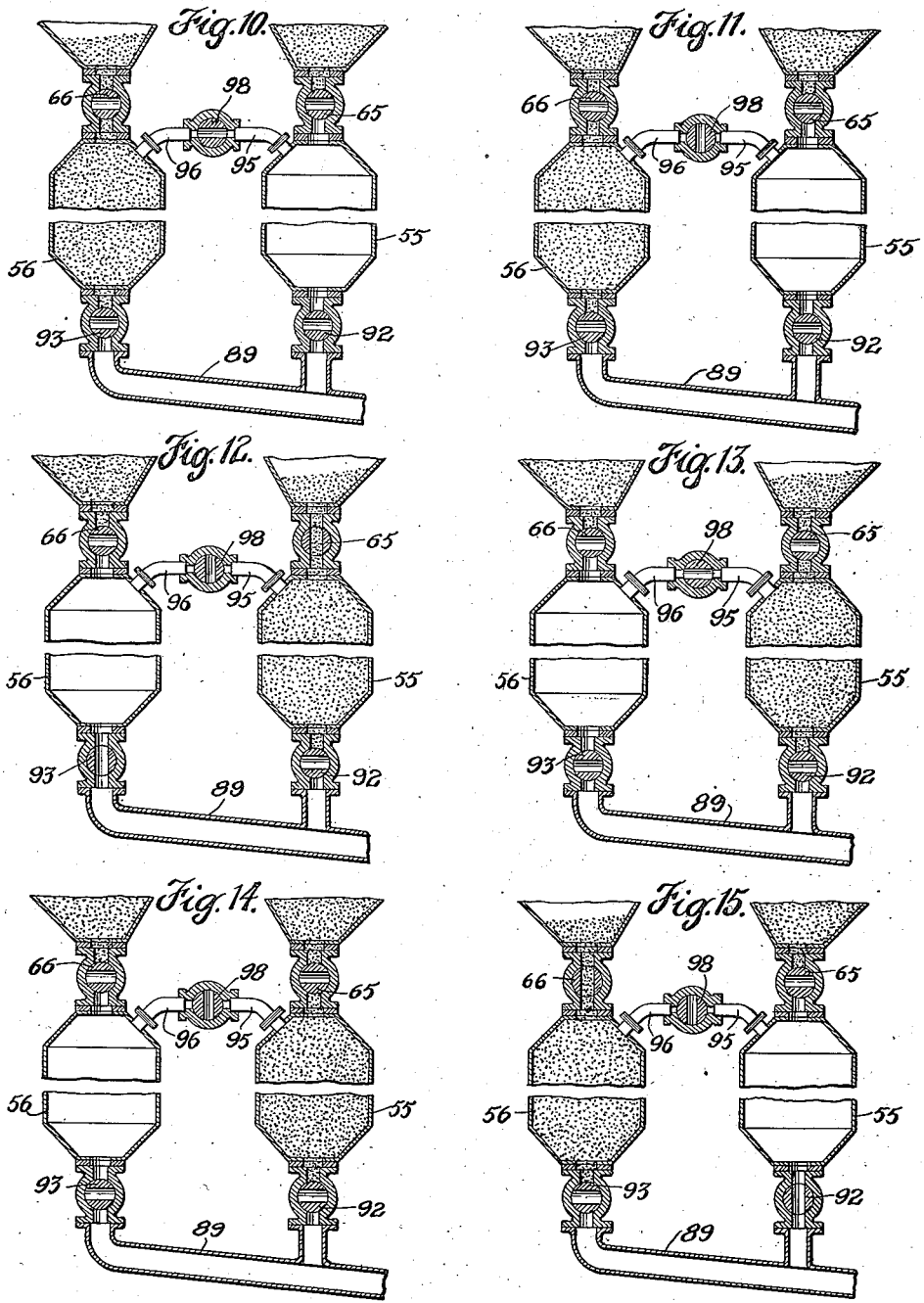

Patented Oct. 23, 1923.

1,471,423

UNITED STATES PATENT OFFICE.

FRANKLIN S. SMITH, OF PHILADELPHIA, PENNSYLVANIA, ASSIGNOR TO THE PRODUCTS PROTECTION CORPORATION, OF NEW YORK, N. Y., A CORPORATION OF DELAWARE.

ART OF TREATING GRAIN IN BULK BY ELECTRICITY.

Application filed February 12, 1919. Serial No. 276,558.

*To all whom it may concern:*

Be it known that I, FRANKLIN S. SMITH, a citizen of the United States, and a resident of Philadelphia, in the county of Philadelphia and State of Pennsylvania, have invented an Improvement in the Art of Treating Grain in Bulk by Electricity, of which the following is a specification.

My invention relates to the art of treating grains of all kinds in bulk with electricity for the purpose of destroying the insect life which may be present therein or thereon; that is, grains not confined or inclosed in cartons, and it has for one of its objects to provide a process or method which may be economically practiced and which, at the same time, shall be efficient and efficacious.

A further object of my invention is to provide a process which may be operated continuously; that is, without interruption as long as the grain and the energy are supplied.

Another and more specific object is to provide a process or method in which the grain is caused to flow continuously through fields or spaces across which electrical disruptive conduction is taking place to destroy the insect life with which such grain may be infested.

Another object of my invention is to effect the treatment in a plurality of successive steps. The grain, of whatever kind or character, is first subjected to electric disruptive conduction through a dielectric of a quality or character such that the insect life upon the surfaces of the grains, or particles thereof, are destroyed, and thereafter to another treatment or other treatments with electrical disruptive conduction energy through a dielectric of a quality or character such that the current is caused to pass through the grains or particles of grain and destroys the insects. their pupae, larvae and eggs which may be present within the interior of the grain or particles thereof.

Another and further object of my invention is to permit the disruptive conductive current to follow around the outer surface of the grains or parts thereof to destroy the insect life which may be present thereon, or to cause the same to pass through the said grains or particles thereof to destroy the insect life which may be present therein by varying and controlling the characteristic or quality of the dielectric through which the disruptive conduction takes place and with which the grains or particles are surrounded.

Another object of my invention is to provide a process of treating grain by means of disruptive conductive current while surrounded with a volume of gas under pressure.

Other objects and advantages of my invention will occur to those skilled in the art and will be apparent from or will be pointed out in the detailed description thereof which follows.

Although the process or method is not dependent upon any particular form or construction of apparatus, some form of apparatus is necessary from a practical standpoint in order that the invention may be of commercial value. Accordingly, therefore, I have illustrated, more or less schematically, one form of apparatus which may be employed in the practicing of my invention. As indicated, it will be understood that other forms of apparatus than that shown may be employed.

Figure 1:
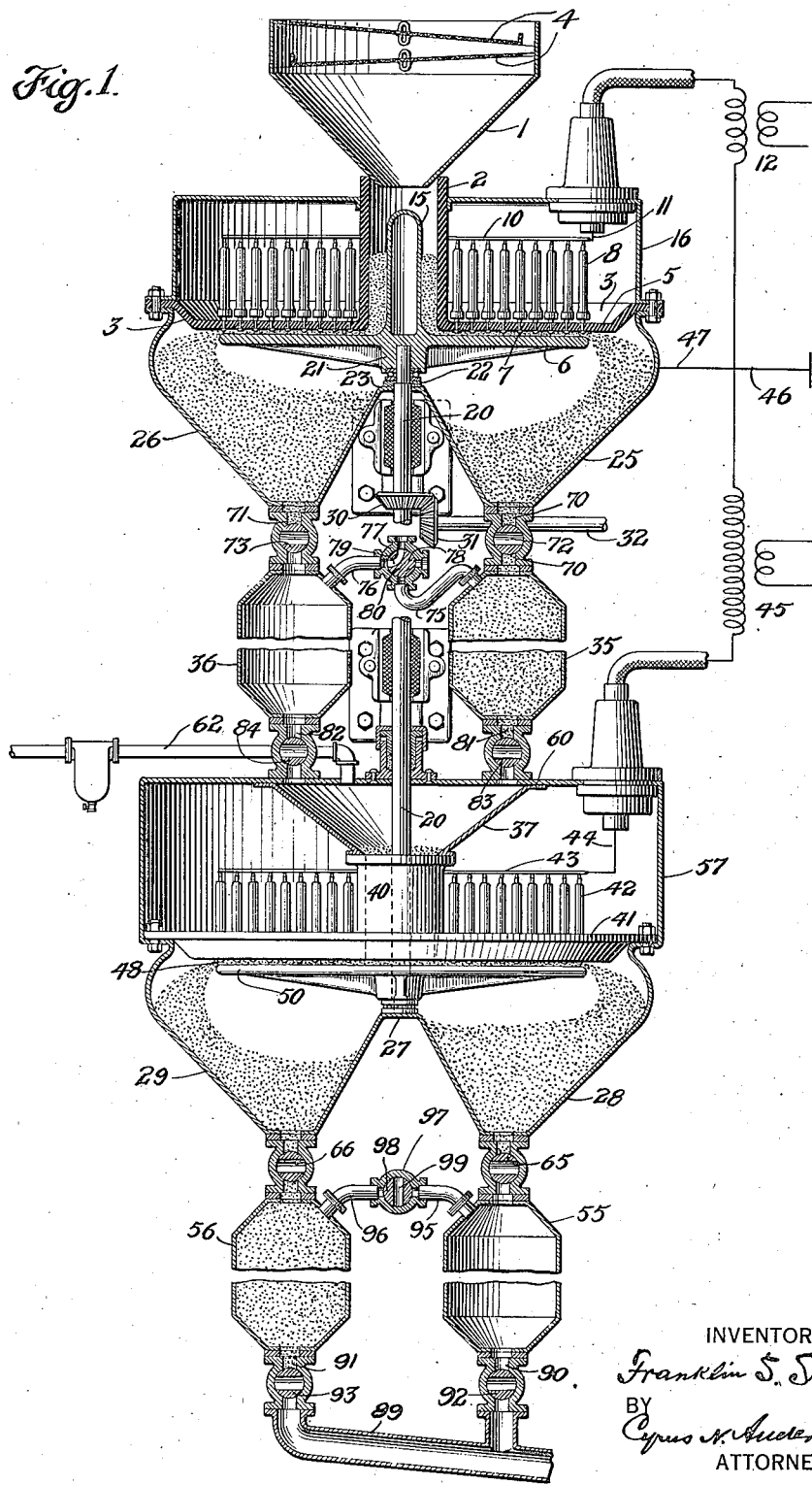
Fig. 1 is a view partly in elevation and partly in vertical section of an apparatus adapted for the carrying out or practicing of my invention.

Figs. 3, 4, 5, 6, 7, 8 and 9 respectively are vertical sectional views of a portion of the apparatus with certain parts thereof in different positions in the different views to indicate the operation thereof in supplying the grain substantially continuously from its region of first treatment to a region or field of second treatment and in controlling the character of the dielectric; and Figs. 10, 11, 12, 13, 14 and 15 are similar views of similar mechanism showing certain parts thereof in different positions to indicate the manner in which the grain, after it has been finally treated, is discharged from the apparatus, also the manner in which it co-operates with the mechanism illustrated in Figs. 3 to 9 and in Fig. 1 control the character of the dielectric in the field of the second and final treatment.

Before proceeding to describe in detail the invention and the apparatus by means of which it may be practiced and which is illustrated in the drawings, a brief description of the process or method will be given.

In the carrying out of the process constituting my invention, grain of all kinds, such as wheat, rye, rice, maize, barley, oats, millet, etc., as well as other granular products which are adapted to be subjected to a treatment in accordance with my invention, is subjected to electrical disruptive conduction successively in dielectrics of different character, whereby the insect life, both upon the surface and upon the interior of the grains being treated is completely destroyed.

Stating the invention somewhat more specifically, the grain, or other granular products which are adapted to be treated according to my invention, is supplied to an apparatus such as herein depicted and is caused to flow first through a field across which electrical disruptive conduction is taking place through a dielectric of a character such that the current will be permitted to flow around or over the grains or particles thereof or other granular material adapted to be treated according to my invention, and destroy the insect life which may be present thereon. The grain or other granular material is thereafter caused to flow through a second field or region containing a dielectric of a character such that the disruptive conductive current which flows or discharges across said field or region is caused to pass through the grains or other granular product and destroy such insect life as may be present within the interior thereof.

The dielectric employed by me in the carrying out of my invention consists of atmospheric air which is employed at normal pressure during the first step of the treatment above mentioned and at a pressure of from approximately two to three atmospheres during the second step of said treatment, depending upon the grain under treatment,—corn requiring, as far as I now know, the highest pressure.

It may be found that in the treatment of certain grain or other granular product the pressure of the air through which the disruptive, conductive current is caused to pass may be less than two atmospheres but more than one, also that in the treatment of other grains a pressure greater than three atmospheres may be required.

Although I prefer to treat the grain or other granular product first in air or other suitable gas at normal pressure and secondly in air or other suitable gas at a pressure above normal as described because when so practiced it is extremely efficient, causing a one-hundred per cent destruction of all insect life which may be present therein, yet the treatment in air at normal pressure may be dispensed with and the entire treatment carried out in air above normal pressure; also the order of the steps may be reversed. If the grain is properly agitated during the treatment and the treatment continued for the proper length of time in air above normal pressure, all of the insect life with which the grain or other granular product may be infested will be completely destroyed.

After the final treatment of the grain or other granular product it preferably should be discharged directly and immediately from the apparatus into the receptacle, of whatever character, which may be prepared therefor. This receptacle should be so constructed as to prevent the access of insects or insect life thereto, otherwise the material which shall have been treated may become reinfested.

Figure 2:
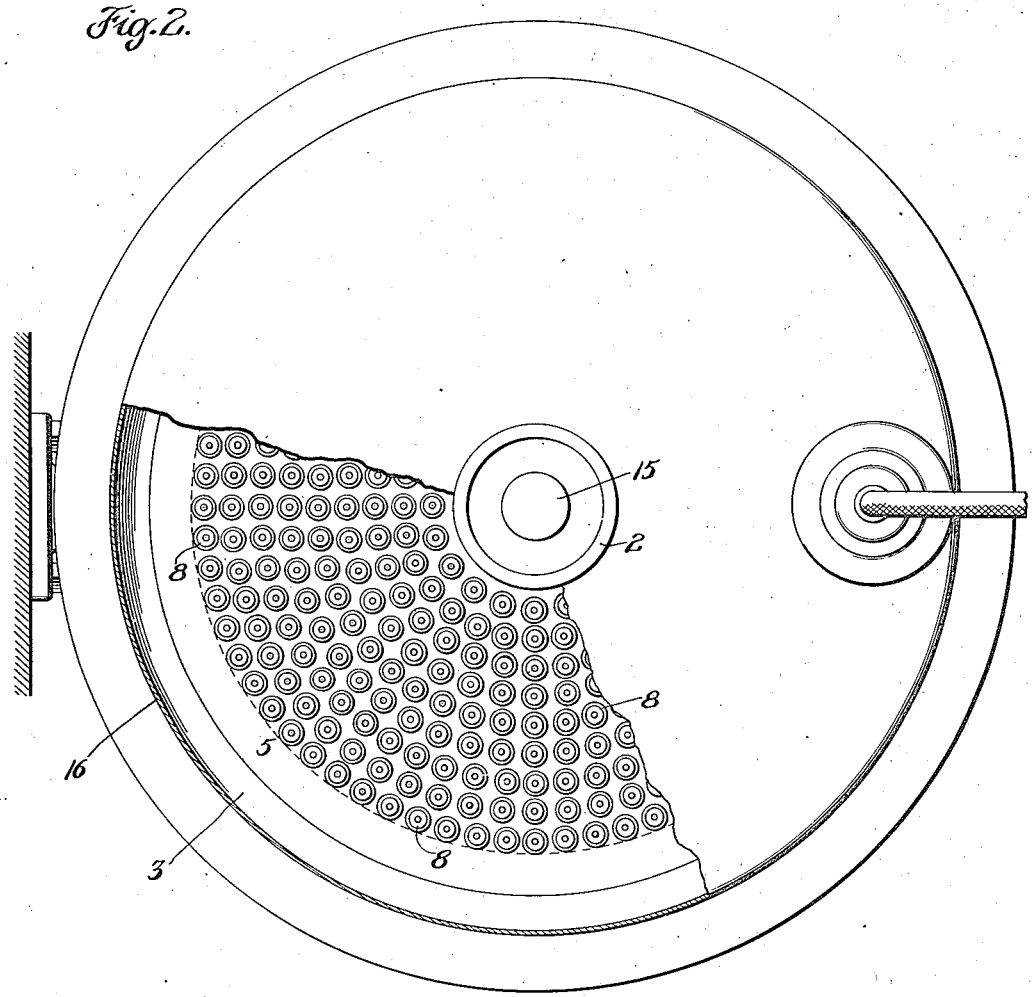
Fig. 2 is a view in top plan with certain of the parts removed and broken away in order to illustrate other parts of the apparatus more clearly.

Referring to the drawings—1 designates a hopper situated at the top part of the apparatus. The lower portion of the said hopper is of funnel shape and its lower end projects into the upper end of a hollow, tubular, hub-like portion 2 which is formed integrally with a saucer shaped circular, sheet member 3 of baekelized fiber or other equivalent material. The upper, open end of the hopper 1 is provided with a couple of screens 4 through which the grain or other granular material to be treated passes. The purpose of the said screens is to prevent the passage into the apparatus of foreign matter. The annular, circuit flat portion 5 of the member 3 is situated a short distance from and in parallel relation to the upper surface of a circular, rotatable disk 6 of steel or other suitable metal. 7 designates a series of metallic balls secured upon the lower ends of metallic stems which project from the electrical condensers 8. There are relatively a large number of these balls as is indicated in Figs. 1 and 2 of the drawings. The upper ends of these condensers are connected to a plate 10 of steel or other suitable metal. The connections with the plate 10 of the respective condensers are of metal and extend into the interior of the body portions thereof and occupy spaced relations with respect to metallic portions having connection with the metallic balls 7. Electric current, either alternating or unidirectional, is supplied to the plate 10 through a wire 11 having connection with the secondary of a transformer 12. It will be understood that when in operation disruptive conduction will take place between the knobs or balls 7 of the condensers and the plate or disk 6.

The center of the plate or disk 6 is provided with a post or upward projection 15 which forms with the interior surface of the hub-like member 2 an annular chamber within the latter around which the grain or other granular material discharged from the hopper 1 accumulates. Such grain or other material is discharged from said annular chamber into the flat, thin, annular space between the annular portion 5 of the member 3 and an annular portion of the disk 6. It may be noted here that preferably the condensers 8 are inclosed within a chamber formed by the inverted covering member 16, the lower edge of which is provided with a lateral annular flange which is secured to the upper, laterally extended edge portion of the member 3.

The rotatable disk member 6 is secured to the upper end of a shaft 20, said upper end projecting into a hole in the lower end of a central hub portion 21 integral with the said disk. The upper end portion of the shaft 20 is supported in a bearing at 22 formed in a central, flattened, wall portion 23 constituting an intermediate portion of duplex, downwardly tapered hoppers or chambers 25 and 26. The lower end of the shaft 20 is supported upon a corresponding part 27 of duplex downwardly tapered hopper members 28 and 29 into which the material is discharged after it is a second time and finally treated. Rotation of the shaft 20 is effected by means of bevel gears 30 and 31, the former being secured to the shaft 20 and the latter upon the inner end of a shaft 32 driven by any suitable power (not shown).

It will be understood that the space intermediate the portion 5 of the member 3 and the disk 6 having direct communication with the atmosphere, the first treatment takes place or is effected in air as a dielectric at normal atmospheric pressure.

The rotation of the disk 6 effects the lateral outward movement of the grain or granular product of other kind, the respective grains or particles thereof traveling in a curvilinear path. In the outward travel of the grain it is thoroughly agitated and the grains turn over and over so that it is presented at different angles and so that every part thereof is presented to the action of the disruptive conductive current. The material is discharged over the edges of the disk 6 and is delivered into the hoppers or receivers 25 and 26. From these it is alternately discharged into receivers 35 and 36, the former being shown as full of material and the latter empty. From these receptacles 35 and 36 the material is alternately discharged into an inverted cone-shaped hopper 37 from which the material is discharged into the upper end of a tubular hollow hub-like member 40 integral with a member 41 of baekelized fiber or other similar equivalent material similar to the member 3. 42 designates condensers like the condensers 8 already referred to and their upper ends are each connected with a steel or other metal plate 43 to which one end of a wire 44 is connected, said wire having connection with the secondary of a transformer 45. The secondary of said transformer has connection also with the secondary of the transformer 12 and both with a ground wire 46 and with a wire 47 having connection with the apparatus as shown. The lower ends of condensers 42 are provided with stems or projections which extend through the bottom annular portion of the member 41 and are provided with knobs 48 like the knobs 7 previously described. These knobs 48 are arranged in a plane parallel to the upper surface of a rotatable disk 50 secured near the lower end of the shaft 20. The passage of the shaft 20 through the hub-like portion 40 forms an annular chamber in the latter. The grain or other material being treated is discharged from this chamber into the laterally extending annular, relatively thin space between the bottom flat portion of the member 41 and the upper surface of the disk 50. Rotation of the latter effects the flow of the said material laterally through the space between the member 41 and the disk 50 in the manner described above in connection with the discharge of the material from the space between the portion 5 of the member 3 and the disk 6. The material as it is discharged after the second treatment described, is delivered into the tapered receiving chambers 28 and 29. From the latter it is discharged into the receiving receptacles 55 and 56.

The tapered hopper 37, the condensers 42 and the plate 43 are inclosed within a chamber formed by the part 57 which is connected to the upper, outer edges of the cone-shaped receiving hoppers 28 and 29. The upper edge of the hopper 37 is secured by an air-tight connection at 60 to the top plate of the inclosing member 57. The interior of the hopper 37 is in communication through the hub-like member 40 with the interiors of the hoppers 28 and 29 and is adapted to be placed in communication with the receptacles 55 and 56 upon properly timed actuations of valves 65 and 66; also with the interiors of the receptacles 35 and 36 upon properly timed actuation of the valves 83 and 84. As already intimated, the second treatment is effected in air under pressure greater than normal atmospheric pressure. It is necessary, therefore, that the chambers or spaces in which the second treatments are effected or performed and to which the air shall have access shall be air-tight so that the air may be maintained at the pressure desired as above described. The air under pressure is delivered to the hopper 37 through a pipe 62, the inner end of which extends through the top part of the plate 57 as shown in Fig. 1. It will be seen that the air delivered at this time has direct access to the region or space between the members 41 and 50 across which the disruptive conductive current flows.

The material is admitted from the hoppers 25 and 26 through passageways 70 and 71 which are adapted to be opened and closed by means of rotatable valves 72 and 73. Communication of the interiors of the receptacles 35 and 36 is effected through pipes 75 and 76, the outer ends of which communicate with a valve casing 77 provided with a rotatable valve 78 having a couple of passages 79 and 80 which extend therethrough. When the said valve is in a certain position the interiors of said receptacles have direct communication with each other through the pipes 75 and 76 and one of the passageways through the valve. When in another position, such as shown in Fig. 3, the outer ends of the pipes 75 and 76 are closed and neither communicate with each other nor with the air. The various positions assumed by the valve 78 are clearly shown in Figs. 1 and 3 to 9 inclusive. The interiors of the receptacles 35 and 36 are in communication with the hopper 37 through passageways 81 and 82 which are adapted to be opened and closed by means of valves 83 and 84.

The treated material which is discharged into the receptacles 55 and 56 is delivered from the latter to a discharge pipe 89 through passageways 90 and 91 which are adapted to be opened and closed by means of valves 92 and 93. Communication between the receptacles 55 and 56 to establish equalization of pressure between the two is effected through pipes 95 and 96 which are joined at their outer ends to a valve casing 97 provided with a rotatable valve 98 having a single passageway 99 extending therethrough.

The operation of the valves to permit the passage of the material alternately from the hoppers 25 and 26 to the hopper 37 is as follows:—Starting with the valves 72, 73, 78, 83 and 84 in the positions in which they are shown in Fig. 1, their next position is shown in Fig. 3. The valve 78 is first turned so as to close the outer ends of both the pipes 75 and 76. This position of the valve 78 is shown in Fig. 3. Then the valves 83 and 73 are turned into open position as shown in said figure, said opening movements being effected simultaneously or successively, preferably in the latter manner. In such position it will be observed that the material has been discharged from the receptacle 35 into the hopper 37 and that the receptacle 36 has been filled with the material. The next thing that happens is that the valves 83 and 73 are closed as shown in Fig. 4. Next the valve 78 is turned so as to bring the pipes 75 and 76 into communication as shown in Fig. 5 so that the pressure between the two receptacles 35 and 36 is equalized.

When the valve 83 is in the position shown in Fig. 3 of the drawing, it will be understood that the interior of the receptacle 35 is in direct communication with the interior of the hopper 37 in which the pressure of the atmospheric air or other gas which may be employed is approximately three atmospheres, and that consequently the pressure in the said receptacle is also approximately three atmospheres. Upon turning the valve 78 in to the position shown in Fig. 5, the pressure will become equalized so that in both of the receptacles 35 and 36 it will be fifteen pounds in excess of normal air pressure, or, in other words, a pressure of two atmospheres in each receptacle.

The next position of the valves is shown in Fig. 6 in which it will be observed that the valve 78 has been turned so as to close the outer end of the pipe 76 and so as to place the outer end of the pipe 75 in communication with the air, thereby reducing the pressure within the receptacle 35 to normal atmospheric pressure.

The next position of the valves is indicated in Fig. 7 in which the valve 78 has been turned so as to close the outer ends of both of the pipes 75 and 76 while the valves 84 and 72 have been opened. In this position the material is permitted to flow out of the receptacle 36 into the hopper 37 while the material, at the same time, is permitted to flow from the hopper 25 into the receptacle 35.

The position next assumed by the valves is indicated in Fig. 8 from which it will be observed that the valve 78 remains in the same position as shown in Fig. 7 but the valves 84 and 72 have been closed.

Figure 9:
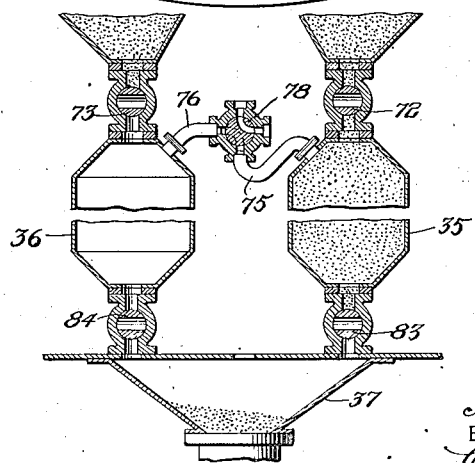

The next position of the valves is shown in Fig. 9 in which the valve 78 has been turned into position so as to establish communication between the pipes 75 and 76 so as to establish equilibrium of air and gas pressure in the receptacles 35 and 36. The next position of the valves is that shown in Fig. 1 of the drawings in which the valves 72, 73, 83 and 84 are still shown as being closed, but the valve 78 has been turned so as to close the outer end of the pipe 75 so as to establish communication of the interior of the receptacle 36 with the outside atmosphere.

During the same time that the valves 72, 73, 78, 83 and 84 are being operated as above described, the valves 65, 66, 92, 93 and 98 are being similarly operated. The operations of these valves are indicated in Figs. 1 and 10 to 15, inclusive, of the drawings.

In Fig. 1 it will be observed that the receptacle 55 has been emptied and that the receptacle 56 has been filled and that the valves 92 and 66 have been closed. The air or gas pressure in the receptacle 56 is approximately three atmospheres because prior to the closing of the valve 66 the interior of said receptacle had been in communication with the chamber of the hopper 29 in which such pressure existed.

The next position of the valves is indicated in Fig. 10 in which it will be observed that the valve 98 has been turned so as to establish communication between the interiors of the receptacles 55 and 56, while the other valves 65, 66, 92 and 93 remain as in Fig. 1. By thus placing the interiors of these two receptacles into communication, the pressure therein is equalized and stands at approximately two atmospheres. Thereafter the valve 98 is turned into closed position as shown in Fig. 11. Next the valves 93 and 65 are opened, preferably successively, as above described. The opening of these valves permits the material to flow from the receptacle 56 into the discharge pipe 89.

It will be noted that at the time of the opening of the valve 93 as last described, the pressure in the receptacle 56 was two atmospheres. This is desirable in order to cause the discharge of the material from the said chamber 56 and also from the chamber 55 under like conditions against the normal air pressure. The successive positions of the valves 65, 66, 92 and 93 are shown in the succeeding Figs. 13, 14 and 15 of the drawings, and it is not thought to be necessary to describe the operation in further detail.

In the first step of the treatment in air at normal pressure, the air and the grain being in series and the permittivity of the grain being greater than air, the latter is broken down and the dielectric strength of the grain being greater than the air "leakage" of the current along the surface of the grain or other granular product which may be under treatment takes place. As already indicated the grain or other granular product under treatment is being agitated and the grains or particles thereof are being turned over and over so that the entire surface of each and every grain or particle is subjected to treatment. In the next step of the treatment in which the air is under pressure, the air and the grain are in series but the placing of the air under pressure has so increased the dielectric strength of the latter that it is greater than that of the grain or other granular product under treatment. Such increase of pressure increases the resistivity of the air. There is relative increase in the conductivity of any insect life which may be present in the grain or particles of whatever granular product which may be under treatment with the result that the current will seek out and, as it were, go after such insect life and destroy it.

Although the invention is illustrated and described in connection with the treatment of grain or other granular product in bulk; that is, with the grain unconfined and not in cartons, it will be understood that it may be employed in the treatment of such products confined or contained in cartons.

By the term air as employed herein it is intended to include and comprehend any suitable gas.

I claim:

1. The process of treating granular material in bulk, which comprises subjecting the same to disruptive conduction and causing the current to pass along the surfaces of the respective granular particles and then causing such a current to pass through said particles.

2. The process of treating grain which consists in causing a disruptive conductive current of electricity to pass along the surfaces of the respective grains, and then also causing such a current to pass through said grains.

3. The process of treating grain with electricity to destroy the insect life with which it may be infested, which comprises subjecting the same to disruptive conduction first in a dielectric of less strength than that of the grain and secondly in a dielectric of greater strength than that of the grain.

4. The process of treating grain with electricity to destroy the insect life with which it may be infested, which comprises the flowing of the grain through a field and subjecting the same as it flows through such field to the action of a disruptive conductive current and causing such current to pass along the outer surface of the respective grains, also causing the said grain to flow through a second field, and, as it flows therethrough, subjecting it to the action of a disruptive conductive current and causing the said current to pass through the respective grains.

5. The process of treating grain with electricity to destroy the insect life with which the same may be infested, which comprises subjecting the same to the action of a disruptive conductive current through atmospheric air at normal pressure and also subjecting the same to a disruptive conductive current through atmospheric air under a pressure of approximately thirty pounds above normal atmospheric pressure.

6. The process of treating grain with electricity to destroy the insect life with which the same may be infested which consists in causing the same to flow in a relatively thin layer through a field filled with a dielectric of less strength than that of the grain, subjecting the same while in such field to the action of a disruptive conductive current, also causing the same to flow in a relatively thin layer through a field filled with a dielectric of greater strength than that of the grain, and subjecting the same while in such field to the action of a disruptive conductive current.

7. The process of treating grain to destroy the insect life with which the same may be infested, which comprises subjecting the same to the action of a disruptive conductive current through a gas surrounding and in contact with the said grain, thereafter varying the condition of the said dielectric to increase its dielectric strength and subjecting the grain to the action of a disruptive conductive current while it is surrounded by the said dielectric.

8. The process of treating grain in bulk which comprises the flowing of the same through a gas having a greater dielectric strength than that of the grain and simultaneously subjecting the said grain to the action of a disruptive conductive current of electricity.

9. The process of treating grain with electricity which comprises subjecting the same to disruptive conduction while surrounded with air under a pressure such that its dielectric strength is rendered greater than that of the grain.

10. The process of treating grain or other granular product with electricity which comprises subjecting the same to the action of disruptive conduction and simultaneously agitating the same.

11. The process of treating grain with electricity which comprises subjecting the same to the action of a disruptive conductive current through a fluid dielectric and simultaneously agitating the said grain or other product and causing it to travel through a field across which said current is discharging.

12. The process of treating grain or other granular products with electricity which comprises subjecting the same to a disruptive conductive current in air at a pressure such that its dielectric strength is greater than that of the grain or other product being treated and simultaneously agitating the said grain or other product and causing it to travel through the field across which the current is flowing.

13. The process of treating grain and other granular material which consists in subjecting it to the action of a disruptive conductive curent through air at normal atmospheric pressure and while surrounded by and in contact with such air and also subjecting it to the action of such a current through air under a pressure greater than atmospheric pressure and while surrounded by and in contact with such air.

14. The process of treating grain and other granular products with electricity to destroy the insect life which may be present therein or thereon, which comprises arranging the same in series with air and placing the latter under pressure and thereby increasing its resistivity and dielectric strength and thereby causing a relative increase of the conductivity of any insect life in or upon the surface of such grain or other product.

15. The process of treating grain and other granular products with electricity to destroy insect life with which the same may be infested, which comprises arranging the same in series with air at atmospheric pressure, subjecting the same to disruptive conduction to cause current to "leak" along the surface of the grains, thereafter arranging the same in series with air under pressure greater than normal atmospheric pressure thereby increasing the relative conductivity of any insect life which may be present in or upon the grain or other product, subjecting the same to inductive conduction and simultaneously agitating the grain or other granular product.

16. The process of treating grain with electricity which comprises the subjection of the same while surrounded with a gas at atmospheric pressure to the action of a disruptive conductive current and also subjecting the same to the action of the disruptive conductive current while surrounded with such gas at a pressure greater than normal atmospheric pressure.

In testimony that I claim the foregoing as my invention I have hereunto set my hand this 11th day of February, A. D., 1919.

FRANKLIN S. SMITH.